(12) United States Patent
Callanan et al.

(10) Patent No.: US 9,037,992 B2
(45) Date of Patent: May 19, 2015

(54) SYSTEM AND METHOD FOR CHANGING SYSTEM MODES

(75) Inventors: Sean Callanan, Churchtown (IE); Patrick Joseph O'Sullivan, Ballsbridge (IE); Hema Srikanth, Raleigh, NC (US); Carol Sue Zimmet, Boxborough, MA (US)

(73) Assignee: International Business Machines Corporation, Armonk, NY (US)

( * ) Notice: Subject to any disclaimer, the term of this patent is extended or adjusted under 35 U.S.C. 154(b) by 661 days.

(21) Appl. No.: 12/344,788

(22) Filed: Dec. 29, 2008

(65) Prior Publication Data

US 2010/0169820 A1    Jul. 1, 2010

(51) Int. Cl.
G06F 3/048      (2013.01)
G06F 3/0482     (2013.01)

(52) U.S. Cl.
CPC .................................... G06F 3/0482 (2013.01)

(58) Field of Classification Search
USPC ......................................... 715/718, 778, 716
See application file for complete search history.

(56) References Cited

U.S. PATENT DOCUMENTS

| | | | | |
|---|---|---|---|---|
| 5,815,577 A * | 9/1998 | Clark | ................ | 380/52 |
| 6,236,398 B1 * | 5/2001 | Kojima et al. | ................ | 345/419 |
| 6,417,869 B1 * | 7/2002 | Do | ................ | 715/718 |
| 6,630,943 B1 * | 10/2003 | Nason et al. | ................ | 715/746 |
| 6,717,596 B1 * | 4/2004 | Nason et al. | ................ | 715/788 |
| 6,727,918 B1 * | 4/2004 | Nason | ................ | 715/791 |
| 6,859,937 B1 * | 2/2005 | Narayan et al. | ................ | 725/37 |
| 6,892,359 B1 * | 5/2005 | Nason et al. | ................ | 715/788 |
| 6,993,722 B1 * | 1/2006 | Greer et al. | ................ | 715/739 |
| 7,003,308 B1 * | 2/2006 | Fuoss et al. | ................ | 455/466 |
| 7,020,841 B2 * | 3/2006 | Dantzig et al. | ................ | 715/727 |
| 7,224,991 B1 * | 5/2007 | Fuoss et al. | ................ | 455/466 |
| 7,576,742 B2 * | 8/2009 | Kanematsu et al. | ................ | 345/427 |
| 7,594,188 B2 * | 9/2009 | Rudolph et al. | ................ | 715/810 |
| 7,698,291 B2 * | 4/2010 | Ziv et al. | ................ | 719/315 |
| 7,698,711 B2 * | 4/2010 | Jeong | ................ | 718/107 |
| 7,761,607 B2 * | 7/2010 | Hassan et al. | ................ | 709/250 |
| 7,814,433 B2 * | 10/2010 | Johanson et al. | ................ | 715/810 |
| 7,846,023 B2 * | 12/2010 | Evans et al. | ................ | 463/42 |
| 7,882,440 B2 * | 2/2011 | Mohr | ................ | 715/746 |
| 7,894,836 B1 * | 2/2011 | Fuoss et al. | ................ | 455/466 |
| 7,908,555 B2 * | 3/2011 | Zellner | ................ | 715/718 |
| 7,913,182 B2 * | 3/2011 | Bear et al. | ................ | 715/778 |
| 7,917,927 B1 * | 3/2011 | Morrison et al. | ................ | 725/43 |
| 7,954,064 B2 * | 5/2011 | Forstall et al. | ................ | 715/779 |
| 8,082,523 B2 * | 12/2011 | Forstall et al. | ................ | 715/863 |
| 2005/0172230 A1 * | 8/2005 | Burk et al. | ................ | 715/716 |
| 2006/0129933 A1 * | 6/2006 | Land et al. | ................ | 715/723 |

(Continued)

Primary Examiner — William Titcomb
(74) Attorney, Agent, or Firm — Holland & Knight LLP; Brian J. Colandreo, Esq.; Jeffrey T. Placker, Esq.

(57) ABSTRACT

A method, computer program product, and computing system for providing a graphical user interface via an operating system. The graphical user interface may be configured to permit a user to define a plurality of modes, one of the modes being a current mode. The method may also include permitting a user to select an updated mode of the plurality of modes, the updated mode being different from the current mode. The computer-implemented method may further include transmitting a message indicating that the updated mode has been selected to a configuration interface associated with at least one application running on the operating system. Numerous other variations and embodiments are also included within the scope of the present disclosure.

17 Claims, 5 Drawing Sheets

(56) References Cited

U.S. PATENT DOCUMENTS

| | | |
|---|---|---|
| 2006/0195434 A1 | 8/2006 | Mourra |
| 2006/0265653 A1* | 11/2006 | Paasonen et al. ............ 715/704 |
| 2007/0088836 A1 | 4/2007 | Tai et al. |
| 2008/0168379 A1* | 7/2008 | Forstall et al. ............... 715/778 |
| 2010/0205533 A1* | 8/2010 | Nykamp ....................... 715/733 |

* cited by examiner

SYSTEM AND METHOD FOR CHANGING SYSTEM MODES

TECHNICAL FIELD

This disclosure relates to a system and method for changing system modes, and more particularly, to permitting a user to change system modes using a graphical user interface associated with the operating system.

BACKGROUND

Users of computer systems may operate their computers in various different modes. For example, the user may be presenting slides in a meeting or at a conference, working on a very complex task, working at their desk at home over broadband, working at their desk at work with dual screens, etc.

When the user changes switches between working in each of these modes they need to remember to set all of their applications to do the appropriate thing. For example, a user presenting at a conference may wish to switch all instant messaging clients to do-not-disturb, close down mail client, disable the screen saver and use dual screens with the personal computer screen as monitor 1 and the projector as monitor 2. Presently, some or all of these issues may be resolved by going to each application individually and selecting the appropriate setting. However, as is often the case, the user may find themselves in the middle of a presentation or other meeting when an instant messaging client appears on screen, the screen saver activates, a new email alert appears, battery management activates and reduces power to the monitor, etc.

SUMMARY OF DISCLOSURE

In a first implementation, a computer-implemented method in accordance with the present disclosure may include providing a graphical user interface via an operating system. The graphical user interface may be configured to permit a user to define a plurality of modes, one of the modes being a current mode. The computer-implemented method may include permitting a user to select an updated mode of the plurality of modes. The updated mode being different from the current mode. The computer-implemented method may further include transmitting a message indicating that the updated mode has been selected to a configuration interface associated with at least one application running on the operating system.

One or more of the following features may be included. The computer-implemented method may also include applying at least one setting associated with the updated mode to the at least one application. The method may further include permitting an administrator to set at least one of the plurality of modes remotely.

In some embodiments, the method may include activating the at least one application in response to a selection of the updated mode. The method may further include specifying an order of activation of the at least one application.

The method may additionally include changing between two of the plurality of modes on a scheduled basis. The method may also include updating at least one of the plurality of modes based upon a calendar event.

In a second implementation, a computer program product residing on a computer readable medium that may have a plurality of instructions stored on it is provided. When executed by a processor, the instructions may cause the processor to perform operations including providing a graphical user interface via an operating system, the graphical user interface configured to permit a user to define a plurality of modes, one of the plurality of modes being a current mode. Instructions may further permit a user to select an updated mode of the plurality of modes, the updated mode being different from the current mode. Instructions may also permit transmitting a message indicating that the updated mode has been selected to a configuration interface associated with at least one application running on the operating system.

One or more of the following features may be included. The computer program product may further include instructions for applying at least one setting associated with the updated mode to the at least one application. The computer program product may additionally include instructions for permitting an administrator to set at least one of the plurality of modes remotely. The computer program product may further include instructions for activating the at least one application in response to a selection of said updated mode.

In some embodiments, the computer program product may also include instructions for specifying an order of activation of the at least one application. The computer program product may further include instructions for changing between two of the plurality of modes on a scheduled basis.

The computer program product may also include instructions for updating at least one of the plurality of modes based upon a calendar event.

In a third implementation, a computing system is provided. The computing system may include a processor and a memory architecture coupled with the processor. The computing system may also include a first software module executed on the processor and the memory architecture, wherein the first software module is configured to provide a graphical user interface via an operating system. The graphical user interface may be configured to permit a user to define a plurality of modes, one of the plurality of modes being a current mode.

The computing system may further include a second software module executed on the at least one processor and the at least one memory architecture, wherein the second software module is configured to permit a user to select an updated mode of the plurality of modes. The updated mode being different from the current mode.

The computing system may also include a third software module executed on the at least one processor and the at least one memory architecture, wherein the third software module is configured to transmit a message indicating that the updated mode has been selected to a configuration interface associated with at least one application running on the operating system.

One or more of the following features may be included. The computing system may also include a fourth software module executed on the at least one processor and the at least one memory architecture, wherein the fourth software module is configured to apply at least one setting associated with the updated mode to the at least one application.

The computing system may further include a fifth software module executed on the at least one processor and the at least one memory architecture, wherein the fifth software module is configured to permit an administrator to set at least one of the plurality of modes remotely.

The computing system may additionally include a sixth software module executed on the at least one processor and the at least one memory architecture, wherein the sixth software module is configured to activate the at least one application in response to a selection of the updated mode.

The computing system may further include a seventh software module executed on the at least one processor and the at least one memory architecture, wherein the seventh software module is configured to specify an order of activation of the at least one application.

The computing system may also include a eighth software module executed on the at least one processor and the at least one memory architecture, wherein the eighth software module is configured to update at least one of the plurality of modes based upon a calendar event.

The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION OF THE PREFERRED EMBODIMENTS

Figure 1:
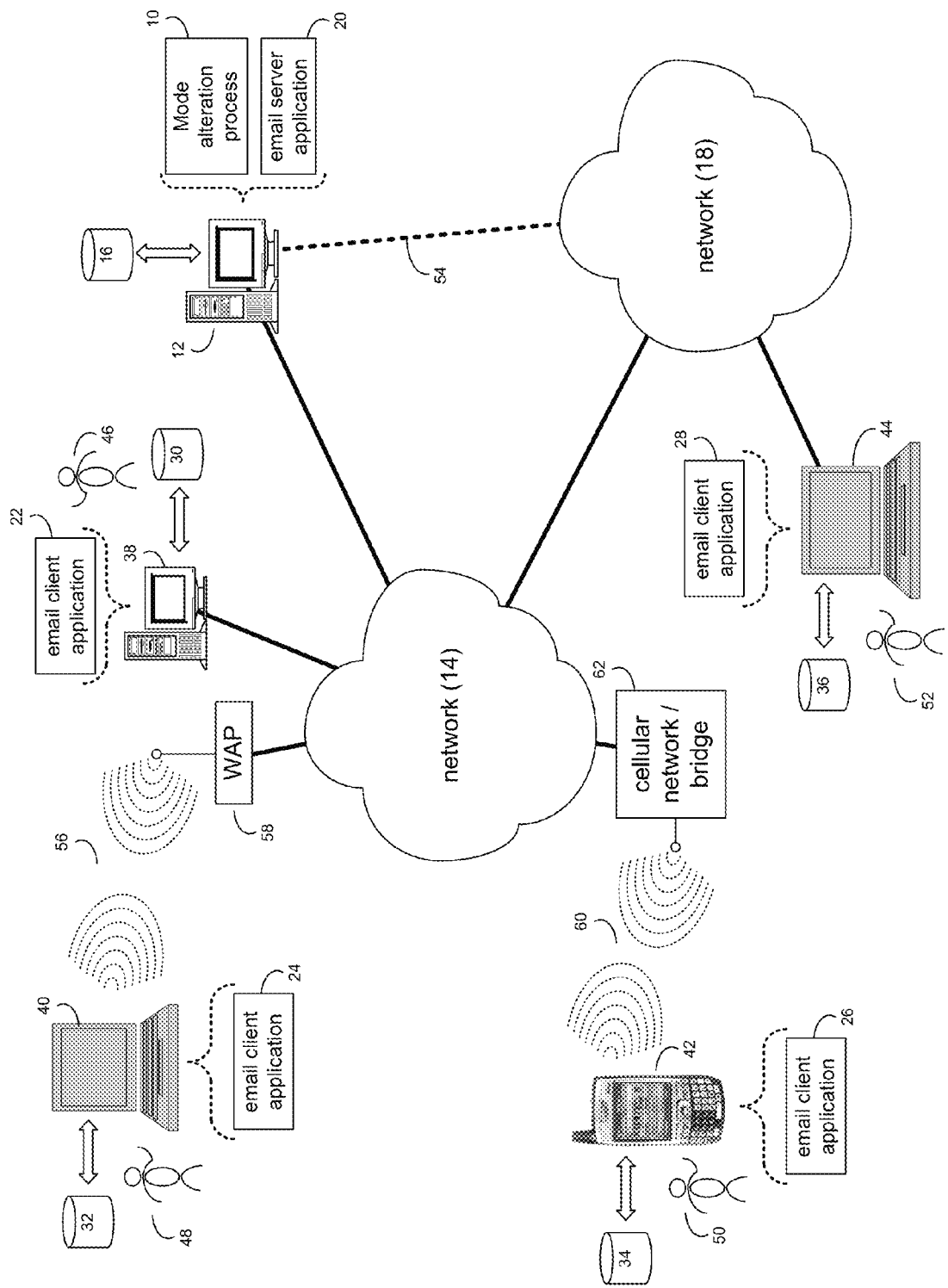
FIG. 1 is a diagrammatic view of a mode alteration process and an email client application coupled to a distributed computing network.

System Overview:

Referring to FIG. 1, there is shown mode alteration process 10 that may reside on and may be executed by server computer 12, which may be connected to network 14 (e.g., the Internet or a local area network). Examples of server computer 12 may include, but are not limited to: a personal computer, a server computer, a series of server computers, a mini computer, and a mainframe computer. Server computer 12 may be a web server (or a series of servers) running a network operating system, examples of which may include but are not limited to: Microsoft Windows XP Server™; Novell Netware™; or Redhat Linux™, for example.

As will be discussed below in greater detail, mode alteration process 10 may provide a graphical user interface via an operating system. The graphical user interface may be configured to permit a user to define a plurality of modes, one of the modes being a current mode. Mode alteration process 10 may also include permitting a user to select an updated mode from the plurality of modes, the updated mode being different from the current mode. Mode alteration process 10 may further include transmitting a message indicating that the updated mode has been selected to a configuration interface associated with at least one application running on the operating system.

The instruction sets and subroutines of mode alteration process 10, which may be stored on storage device 16 coupled to server computer 12, may be executed by one or more processors (not shown) and one or more memory architectures (not shown) incorporated into server computer 12. Storage device 16 may include but is not limited to: a hard disk drive; a tape drive; an optical drive; a RAID array; a random access memory (RAM); and a read-only memory (ROM).

Server computer 12 may execute a web server application, examples of which may include but are not limited to: Microsoft IIS™, Novell Webserver™, or Apache Webserver™, that allows for HTTP (i.e., HyperText Transfer Protocol) access to server computer 12 via network 14. Network 14 may be connected to one or more secondary networks (e.g., network 18), examples of which may include but are not limited to: a local area network; a wide area network; or an intranet, for example.

Server computer 12 may execute email server application 20, examples of which may include but are not limited to Lotus Domino™ Server and Microsoft Exchange™ Server. Email server application 20 may be a mail transfer agent that may store and route email to one or more email client applications 22, 24, 26, 28, examples of which may include but are not limited to Lotus Notes™ and Microsoft Outlook™ Mode alteration process 10 may be a stand alone application that interfaces with email server application 20 or an applet/application that is executed within email server application 20.

The instruction sets and subroutines of email server application 20, which may be stored on storage device 16 coupled to server computer 12 may be executed by one or more processors (not shown) and one or more memory architectures (not shown) incorporated into server computer 12.

The instruction sets and subroutines of email client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory architectures (not shown) incorporated into client electronic devices 38, 40, 42, 44 (respectively). Storage devices 30, 32, 34, 36 may include but are not limited to: hard disk drives; tape drives; optical drives; RAID arrays; random access memories (RAM); read-only memories (ROM), compact flash (CF) storage devices, secure digital (SD) storage devices, and memory stick storage devices. Examples of computing devices 38, 40, 42, 44 may include, but are not limited to, personal computer 38, laptop computer 40, personal digital assistant 42, notebook computer 44, a data-enabled, cellular telephone (not shown), and a dedicated network device (not shown), for example. Using email client applications 22, 24, 26, 28, users 46, 48, 50, 52 may access email server application 20 and may retrieve and/or organize email messages.

Users 46, 48, 50, 52 may access email server application 20 directly through the device on which the email client application (e.g., email client applications 22, 24, 26, 28) is executed, namely client electronic devices 38, 40, 42, 44, for example. Users 46, 48, 50, 52 may access email server application 20 directly through network 14 or through secondary network 18. Further, server computer 12 (i.e., the computer that executes email server application 20) may be connected to network 14 through secondary network 18, as illustrated with phantom link line 54.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (i.e., WAP) 58, which is shown directly coupled to network 14. WAP 58 may be, for example, an IEEE 802.11a, 802.11b, 802.11g, Wi-Fi, and/or Bluetooth device that is capable of establishing wireless communication channel 56 between laptop computer 40 and WAP 58. Personal digital assistant 42 is shown wirelessly coupled to network 14 via wireless communication channel 60 established between personal digital assistant 42 and cellular network/bridge 62, which is shown directly coupled to network 14.

As is known in the art, all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. As is known in the art, Bluetooth is a telecommunications industry specification that allows e.g., mobile phones, computers, and personal digital assistants to be interconnected using a short-range wireless connection.

Client electronic devices 38, 40, 42, 44 may each execute an operating system, examples of which may include but are not limited to Microsoft Windows™, Microsoft Windows CE™, Redhat Linux™, or a custom operating system. Mode alteration process 10 may be configured to operate in conjunction with any of the above mentioned operating systems. More specifically, mode alteration process 10 may provide an interface for a user to change system modes across all applications from a single user event accessible through an operating system interface. The details of the mode alteration process are described in further detail below.

The Mode Alteration Process:

Referring again to FIG. 1, there is shown mode alteration process 10 that may reside on and may be executed by server computer 12 and/or any of client-side devices 38, 40, 42, and 44. Mode alteration process 10 may be a stand alone application that interfaces with server computer 12 and/or any of client side devices 38, 40, 42, and 44. Mode alteration process 10 may operate in conjunction with the existing operating system associated with a particular device (e.g., server computer 12).

While mode alteration process 10 will be described below as being executed on personal computer 38 (i.e., a client-side process), this is for illustrative purposes only and is not intended to be a limitation of this disclosure, as other configurations are possible. For example, mode alteration process 10 may be executed on server computer 12 (i.e., a server-side process), a client-side process (e.g., a client-side messaging process being executed on personal computer 38, a client-side messaging process being executed on laptop computer 40, a client-side messaging process being executed on personal digital assistant 42, or a client-side messaging process being executed on notebook computer 44), or a hybrid server-side/client-side process (e.g., the combination of mode alteration process 10 and one or more of a client-side mode alteration process 10 being executed on personal computer 38, a client-side mode alteration process being executed on laptop computer 40, a client-side mode alteration process being executed on personal digital assistant 42, or a client-side mode alteration process being executed on notebook computer 44).

The instruction sets and subroutines of mode alteration process 10, which may be stored on storage device 16 coupled to server computer 12, may be executed by one or more processors (not shown) and one or more memory architectures (not shown) incorporated into server computer 12.

If mode alteration process 10 is configured as a client-side process and/or a hybrid server-side/client-side process, all or a portion of the instruction sets and subroutines of mode alteration process 10 may be stored on storage devices 30, 32, 34, 36 coupled to client electronic devices 38, 40, 42, 44 (respectively) and may be executed by one or more processors (not shown) and one or more memory architectures (not shown) incorporated into client electronic devices 38, 40, 42, 44 (respectively).

Figure 2:
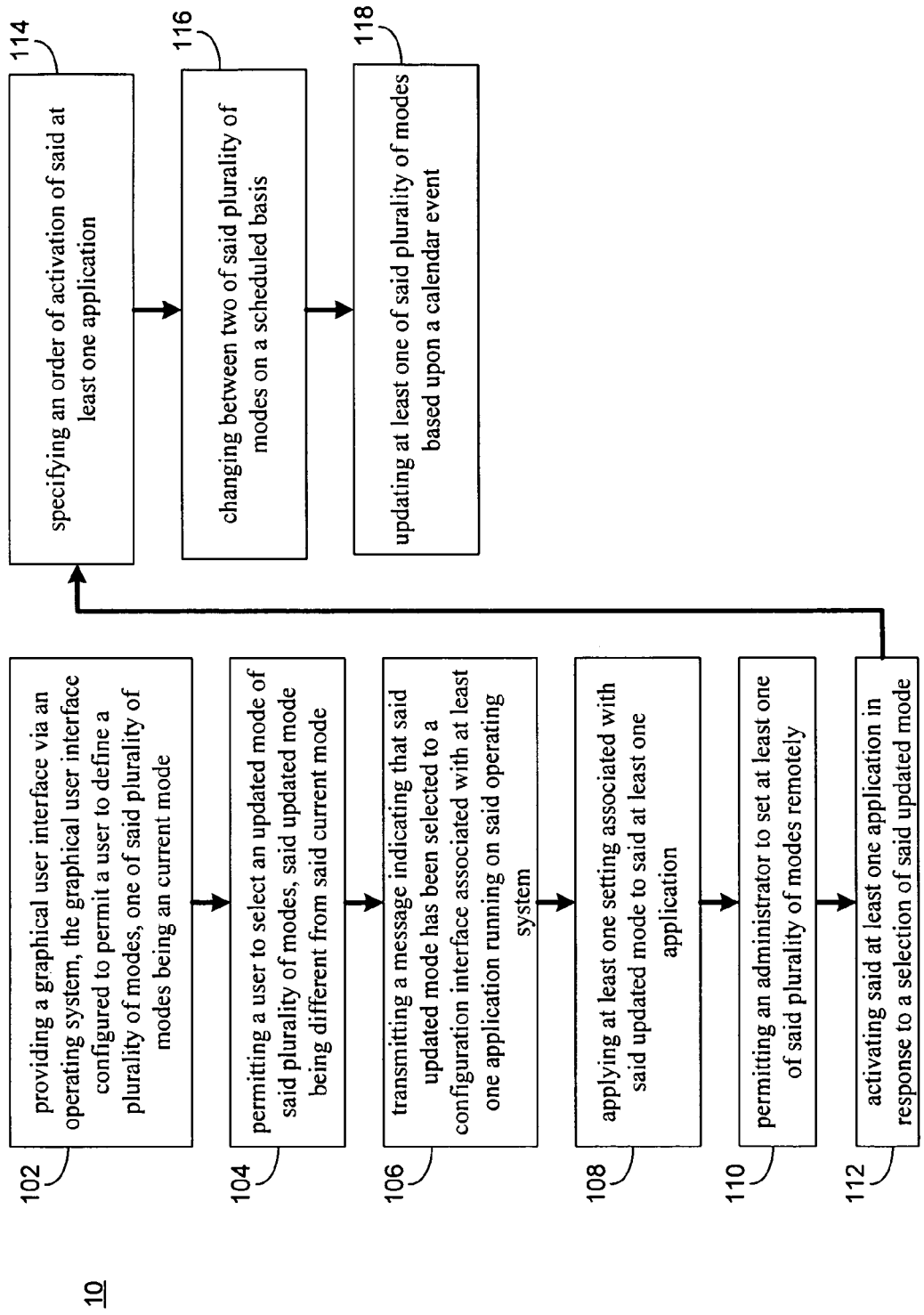
FIG. 2 is a flowchart of the mode alteration process of FIG. 1.
Figure 3:
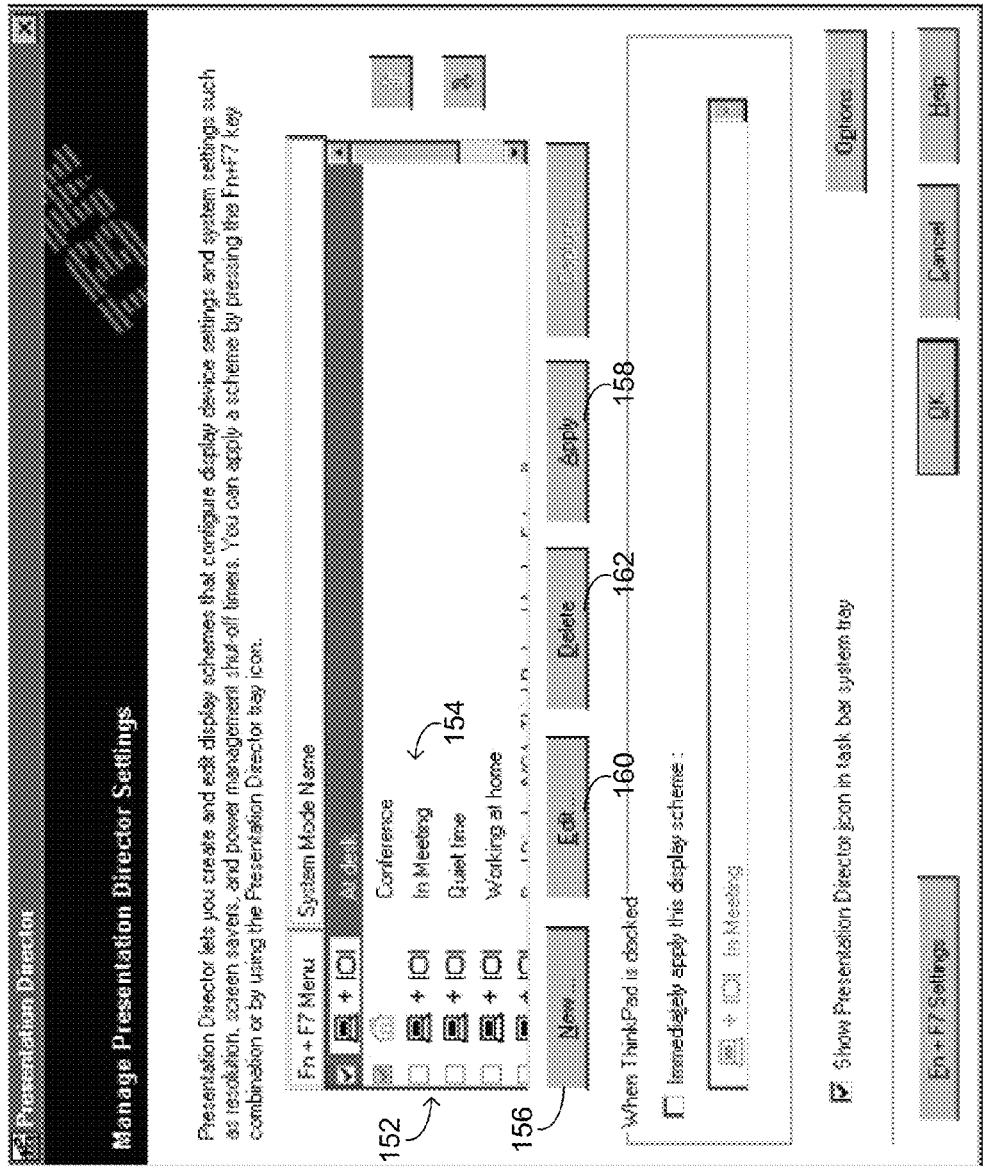
FIG. 3 is a diagrammatic view of a display screen rendered by the server device of FIG. 1.
Figure 4:
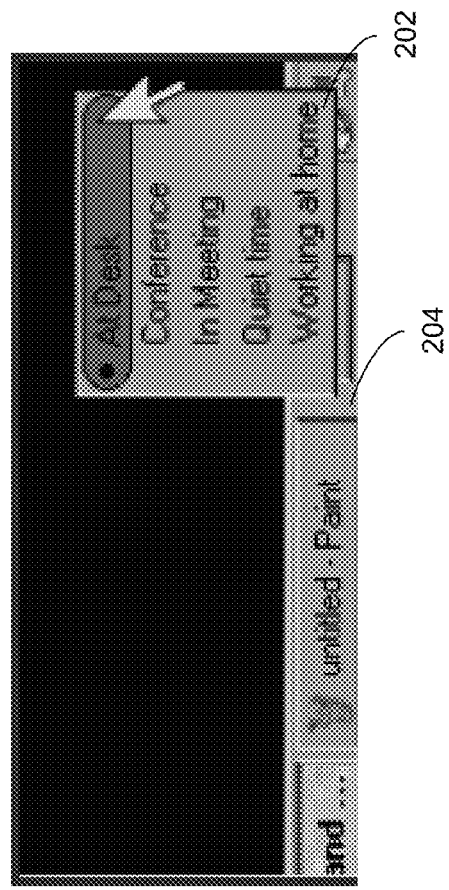
FIG. 4 is a diagrammatic view of a display screen rendered by the mode alteration process and/or server device of FIG. 1.

Referring now to FIGS. 2-4, an embodiment of mode alteration process 10 is provided. Mode alteration process 10 may include providing a graphical user interface (GUI) 150 via an operating system (102). The operating system may include, but is not limited to, those discussed above. Graphical user interface 150 may be configured to permit a user to define a plurality of modes. Modes 152 and their associated names 154 may be defined by the user, e.g. user 46 using client electronic device 38. Modes 152 and mode names 154 may be presented to the user using a drop-down menu, list, or any other suitable means.

Mode names 154 may correspond to the type of operation being performed by the user. For example, some mode names are shown in GUI 150 as "At desk", "Conference", "In meeting", "Quiet time", "Working at home", etc. It should be noted that mode names 154 shown in GUI 150 are merely for exemplary purposes. A user may create his/her own mode names and adjust the associated settings accordingly. Moreover, a user may have the option of creating new modes 156, applying existing predefined modes 158, editing existing modes 160, and/or deleting modes 162.

Each mode of the plurality of modes 152 may have a number of settings associated therewith. These settings may be defined by the user to represent the user's particular desires for each mode. For example, the user may associate activating email and a VPN with the mode "Working at home." Alternatively, the user may associate disabling instant messaging, disabling the screen saver, and activating a dual-screen application having his/her laptop as monitor 1 and a projector as monitor 2 with the mode "Conference." Of course, these examples are set forth merely for exemplary purposes as numerous other settings associated with various applications could be applied in the context of the present disclosure.

Mode alteration process 10 may allow a user to change system modes across all applications by selecting an updated mode from GUI 150 (104). Once selected, this updated mode may then replace the mode that the system is currently operating in (i.e., the current mode). For example, GUI 150 indicates that "at desk" mode is the current mode using a highlighting function. The user may wish to switch to "In meeting" mode and may do so by applying the "In meeting" mode option.

A user may access GUI 150 using any number of suitable techniques. In some embodiments, the user may activate GUI 150 and/or switch between modes using a pre-defined keystroke, which may cause personal computer 38 to render GUI 150. GUI 150 may then provide a list of the possible modes as is shown in FIG. 3. The current mode may be indicated to the user using a visual indicator, which may include, but is not limited to, highlighting, checked box, etc.

Moreover, FIG. 4 shows an additional embodiment through which mode alteration process 10 may be performed and/or accessed on a display screen 200. In this embodiment, a user may execute a keystroke to cause a computing device (e.g., client electronic device 38) to render GUI 202. GUI 202 may display a menu or drop-down list that provides a user with the modes available. The user may then select the desired mode. As discussed above, the user may add, delete, and/or edit these modes as necessary. In some embodiments, GUI 202 may also be accessible through an icon on the desktop or taskbar 204 associated with the computing device.

In some embodiments, each application associated with the computing device (e.g., client-side device 38) may provide a configuration interface. The configuration interface may allow the user to specify the specific application features that will apply for each defined mode within the particular application.

In this way, mode alteration process 10 may also be configured to transmit a message indicating that an updated mode has been selected to the configuration interface associated with some or all of the applications running on the operating system (106). In the event that the user has switched modes, or alternatively changed the mode settings, the operating system may send out a system message to indicate these changes. In the event that a particular application is interested in the mode change, it may make a system call to discover the identity of the new mode. If the user has specified settings for this mode the application may apply those settings.

Mode alteration process 10 may subsequently, apply some or all of the settings associated with the updated mode to the necessary applications (108). In some cases, this may involve activating an application in response to the updated mode (112). Moreover, mode alteration process 10 may specify an order of activation for the applications involved (114). For example, user 46 may be working at client-side device 38 and may choose "at desk" mode. As configured by user 46 or an administrator, "at desk" mode may require activation of email client application 22 first, followed by other applications. The user may specify and/or edit this order as desired.

Moreover, mode alteration process 10 may be configured to allow the system to start "N" programs based on the selected mode. For example, a user who selects the "Working at home" mode may want their email and VPN client to start immediately. The user may further specify a desire for the VPN client to be the first application to respond and/or activate.

In some embodiments, the operating system may generate a query to obtain the system's current mode. This query may originate from the user of a particular device (e.g. user 46 of client-side device 38) or alternatively from a network administrator. In this way, the network administrator may be permitted to set and/or edit modes 152 remotely (110). For example, all systems in an organization might be configured with a Grid Network mode. An administrator could select this mode on all devices in the organization after a certain time at night to allow all systems to contribute to the grid.

In some embodiments, mode alteration process 10 may additionally include changing between modes on a scheduled basis (116). For example, a user working from home may want to use the "working from home" mode during the hours of 8 am to 5 pm. However, after 5 pm the user may want the system to automatically switch to "quiet time" mode. As such, mode alteration process 10 may be configured to allow for such flexibility, if the user so chooses.

Figure 5:
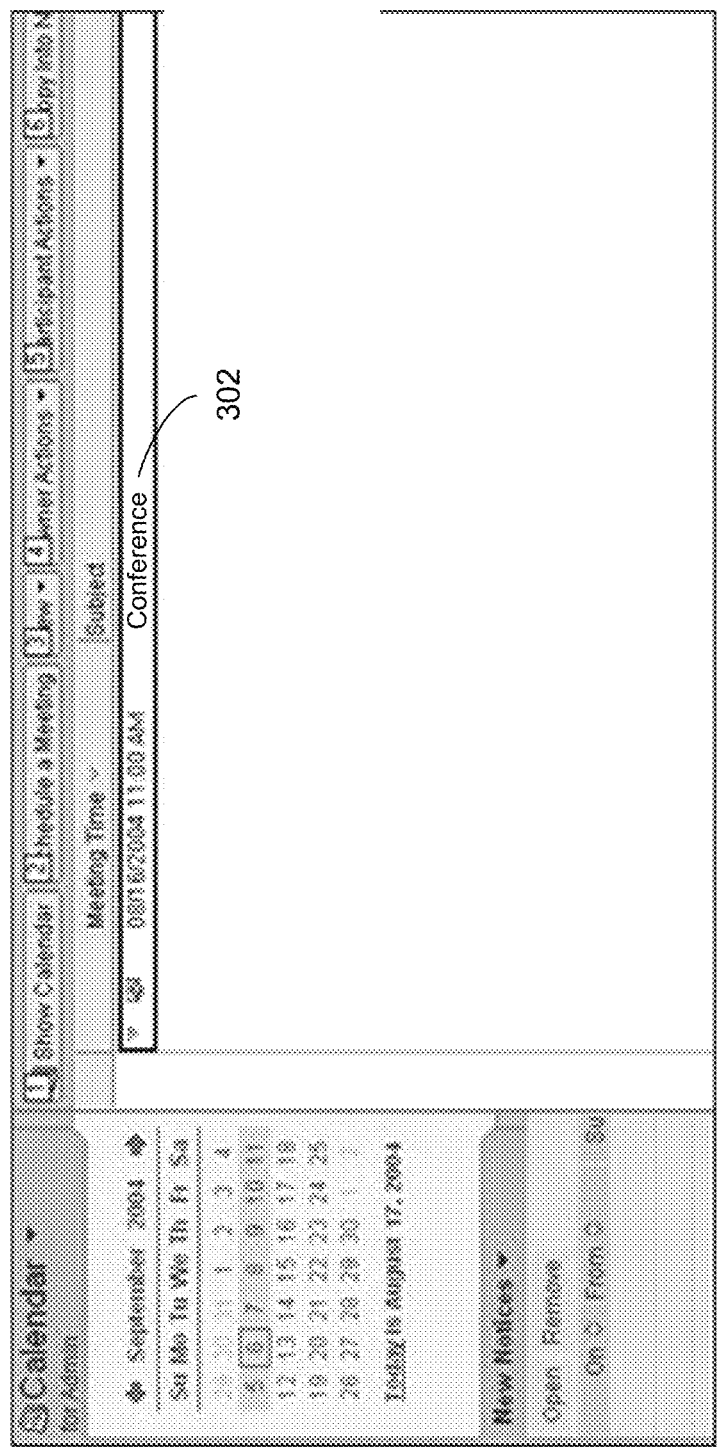
FIG. 5 is a diagrammatic view of a calendar accessible by the mode alteration process.

Referring now to FIG. 5, mode alteration process 10 may be configured to update a mode based upon a calendar event (118). For example, mode alteration process 10 may be capable of determining whether a particular event is scheduled to take place by communicating with calendar 300 of the user's email client application (e.g., email client application 22 of client electronic device 38). Here, the user may input a particular event at a certain date in his/her calendar. If event 302 is detected, e.g., a conference, the mode may be automatically updated without any additional user intervention. For example, a user may specify that a particular meeting event would cause the system to change to "In Meeting" mode when the calendar event is triggered. This may be set as a default for all meetings created or accepted and it may be possible to override the default for specific events. As shown in FIG. 5, mode alteration process 10 may also permit the system to change to "Conference mode" if the calendar event indicates that the user has a speaking appointment at a conference.

In some embodiments, mode alteration process 10 may be configured to change between two of the modes if the operating system undergoes a system change. For example, if a low memory situation occurred the user may want the system to change to a "Conserve memory" mode where only high priority applications would remain open.

In some embodiments, mode alteration process 10 may be configured to permit the selection of multiple modes at any given time. In the event of a conflict in specifications, an order of precedence may be established. For example, a volume setting that is high in one mode and low in another may be controlled by the higher ordered mode specification, and/or determined based on the user's settings.

Similarly, mode alteration process 10 may be configured to permit operation of more than one of the plurality of modes 152 simultaneously. For example, a user may select both "conference" and "working from home" if conducting a conference call at home or "conference" and "at desk" if conducting a conference call at work. Of course, numerous other combinations are also within the scope of the present disclosure.

In some embodiments, mode alteration process 10 may be configured to archive the user's modes and/or share the user's modes and settings with other users. In other words, mode alteration process 10 may be configured to support an import/export facility for these modes and personalized settings. This option may also support the ability to send a mode specification to other user(s), so that it can operate associated with an event. For example, mode alteration process 10 may associate a mode specification as part of a web conference or electronic invite, where the mode may be received and executed by the web conference attendee or meeting attendee. Also through the import/export facility, the mode specifications may be shared across a user's personal systems where the operating systems may be different.

In some embodiments, mode alteration process 10 may be configured to specify details about how individual applications are loaded and to ensure that specific parameters are executed. Mode alteration process 10 may also be configured to assist in preventing some unnecessary components from being loaded.

Some of the embodiments described above may be implemented as software modules executed by a processor of a computing system, and/or in a computer program product that may be stored on a storage medium having instructions that when executed by a processor perform the messaging process described herein. The storage medium may include, but is not limited to, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of media suitable for storing electronic instructions. Other embodiments may be implemented as software modules executed by a programmable control device.

A number of implementations have been described. Nevertheless, it will be understood that various modifications may be made. Accordingly, other implementations are within the scope of the following claims.

What is claimed is:

1. A computer-implemented method comprising:
providing, by a computing device, a graphical user interface via an operating system, the graphical user interface configured to permit a user to define a plurality of system modes, wherein each of the plurality of system modes is associated with at least one predefined setting of a plurality of applications, wherein the plurality of applications includes at least two of an email client, a VPN client, an instant messaging client, and a calendar client;

receiving, by the computing device, a selection of a first system mode and a second system mode of the plurality of system modes from the user, the second system mode having a different at least one predefined setting of the plurality of applications from the first system mode;

transmitting, by the computing device, a system message to the plurality of applications indicating that the first system mode and the second system mode have been selected;

applying, by the computing device, changes to the at least one predefined setting of the plurality of applications responsive to the received system message based on the first system mode and the second system mode being selected simultaneously, including activating or deactivating the plurality of applications based on a predetermined specified order of precedence of activation or deactivation of the plurality of applications in the event of a conflict between the first system mode and the second system mode, wherein the predetermined specified order of precedence is specified prior to the conflict between the first system mode and the second system mode; and sharing, by the computing device, at least one of the defined plurality of system modes with at least one other user associated with a different computing device.

2. The computer-implemented method of claim 1 wherein the at least one predefined setting of the second system mode is associated with a second computing device.

3. The computer-implemented method of claim 1 further comprising permitting an administrator to set at least one of the plurality of system modes remotely.

4. The computer-implemented method of claim 1 further comprising changing between two of the plurality of system modes on a scheduled basis.

5. The computer-implemented method of claim 1 further comprising updating at least one of the plurality of system modes based upon a calendar event.

6. The computer-implemented method of claim 5 wherein updating at least one of the plurality of system modes based upon the calendar event includes updating at least one of the plurality of system modes if the calendar event indicates a type of event.

7. A computer program product residing on a non-transitory computer readable medium having a plurality of instructions stored thereon which, when executed by a processor, cause the processor to perform operations comprising:

providing a graphical user interface via an operating system, the graphical user interface configured to permit a user to define a plurality of system modes, wherein each of the plurality of system modes is associated with at least one predefined setting of a plurality of applications, wherein the plurality of applications includes at least two of an email client, a VPN client, an instant messaging client, and a calendar client;

receiving a selection of a first system mode and a second system mode of the plurality of system modes from the user, the second system mode having a different at least one predefined setting of the plurality of applications from the first system mode;

transmitting a system message to the plurality of applications indicating that the first system mode and the second system mode have been selected;

applying changes to the at least one predefined setting of the plurality of applications responsive to the received system message based on the first system mode and the second system mode being selected simultaneously, including activating or deactivating the plurality of applications based on a predetermined specified order of precedence of activation or deactivation of the plurality of applications in the event of a conflict between the first system mode and the second system mode, wherein the predetermined specified order of precedence is specified prior to the conflict between the first system mode and the second system mode; and sharing at least one of the defined plurality of system modes with at least one other user associated with a different computing device.

8. The computer program product of claim 7 further wherein the at least one predefined setting of the second system mode is associated with a second computing device.

9. The computer program product of claim 7 further comprising instructions for permitting an administrator to set at least one of the plurality of system modes remotely.

10. The computer program product of claim 7 further comprising instructions for changing between two of the plurality of system modes on a scheduled basis.

11. The computer program product of claim 7 further comprising instructions for updating at least one of the plurality of system modes based upon a calendar event.

12. The computer program product of claim 11 wherein updating at least one of the plurality of system modes based upon the calendar event includes updating at least one of the plurality of system modes if the calendar event indicates a type of event.

13. A computing system comprising:

at least one processor;

at least one memory architecture coupled with the at least one processor;

a first software module executed on the at least one processor and the at least one memory architecture, wherein the first software module is configured to provide a graphical user interface via an operating system, the graphical user interface configured to permit a user to define a plurality of system modes, wherein each of the plurality of system modes is associated with at least one predefined setting of a plurality of applications, wherein the plurality of applications includes at least two of an email client, a VPN client, an instant messaging client, and a calendar client;

a second software module executed on the at least one processor and the at least one memory architecture, wherein the second software module is configured to receive a selection of a first system mode and a second system mode of the plurality of system modes, the second system mode having a different at least one predefined setting of the plurality of applications from the first system mode;

a third software module executed on the at least one processor and the at least one memory architecture, wherein the third software module is configured to transmit a system message to the plurality of applications indicating that the first system mode and the second system mode have been selected;

a fourth software module executed on the at least one processor and the at least one memory architecture, wherein the fourth software module is configured to apply changes to the at least one predefined setting of the plurality of applications responsive to the received system message based on the first system mode and the second system mode being selected simultaneously, including activating or deactivating the plurality of applications based on a predetermined specified order of precedence of activation or deactivation of the plurality of applications in the event of a conflict between the first system mode and the second system mode, wherein the predetermined specified order of precedence is specified prior to the conflict between the first system mode and the second system mode; and a fifth software module executed on the at least one processor and the at least one memory architecture, wherein the fifth software module is configured to share at least one of the defined plurality of system modes with at least one other user associated with a different computing device.

14. The computing system of claim 13, wherein the at least one predefined setting of the second system mode is associated with a second computing device.

15. The computing system of claim 13 further comprising a sixth software module executed on the at least one processor and the at least one memory architecture, wherein the sixth software module is configured to permit an administrator to set at least one of the plurality of system modes remotely.

16. The computing system of claim 13 further comprising an eighth software module executed on the at least one processor and the at least one memory architecture, wherein the eighth software module is configured to update at least one of the plurality of system modes based upon a calendar event.

17. The computing system of claim 16 wherein updating at least one of the plurality of system modes based upon the calendar event includes updating at least one of the plurality of system modes if the calendar event indicates a type of event.

\* \* \* \* \*